United States Patent
Suzuki

(10) Patent No.: US 10,220,669 B2
(45) Date of Patent: Mar. 5, 2019

(54) AIR PASSAGE OPENING AND CLOSING DEVICE

(71) Applicant: DENSO CORPORATION, Kariya, Aichi-pref. (JP)

(72) Inventor: Yoshihiro Suzuki, Anjo (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 232 days.

(21) Appl. No.: 14/441,459

(22) PCT Filed: Oct. 24, 2013

(86) PCT No.: PCT/JP2013/006303
§ 371 (c)(1),
(2) Date: May 7, 2015

(87) PCT Pub. No.: WO2014/073175
PCT Pub. Date: May 15, 2014

(65) Prior Publication Data
US 2015/0283873 A1   Oct. 8, 2015

(30) Foreign Application Priority Data

Nov. 8, 2012  (JP) ................. 2012-246456

(51) Int. Cl.
*B60H 1/00* (2006.01)
*F24F 13/10* (2006.01)
*F24F 13/12* (2006.01)

(52) U.S. Cl.
CPC ..... *B60H 1/00071* (2013.01); *B60H 1/00692* (2013.01); *F24F 13/10* (2013.01);
(Continued)

(58) Field of Classification Search
CPC ............ B60H 1/00071; B60H 1/00692; B60H 2001/00092; B60H 2001/0015; F24F 13/10; F24F 13/12
(Continued)

(56) References Cited

U.S. PATENT DOCUMENTS 6,347,988 B1 * 2/2002 Kurokawa ......... B60H 1/00692
165/42
6,609,563 B1    8/2003 Tsurushima et al.
(Continued)

FOREIGN PATENT DOCUMENTS

JP    H08192701 A    7/1996
JP    H10213091 A    8/1998
(Continued)

OTHER PUBLICATIONS

Office Action dated Mar. 1, 2016 issued in the corresponding JP application No. 2012-246456 in Japanese with English translation.
(Continued)

*Primary Examiner* — Gregory Huson
*Assistant Examiner* — Dana Tighe
(74) *Attorney, Agent, or Firm* — Harness, Dickey & Pierce, P.L.C.

(57) ABSTRACT

An air passage opening and closing device has: a case defining an air passage; and a slide door provided with a door body that has a plate shape, the slide door slidably disposed in the case and opening or closing the air passage. The case is provided with a case-side sealing surface that is in contact with the door body when the slide door is located to close the air passage. The door body is provided with a rib that protrudes toward an upstream side in a flow direction of air and extends in a moving direction of the slide door.

13 Claims, 7 Drawing Sheets

(52) U.S. Cl.
CPC ............... *B60H 2001/0015* (2013.01); *B60H 2001/00092* (2013.01); *F24F 13/12* (2013.01)

(58) Field of Classification Search
USPC ........................... 454/69, 143, 145, 153, 127
See application file for complete search history.

(56) References Cited

U.S. PATENT DOCUMENTS

| | | | |
|---|---|---|---|
| 6,688,964 B2 * | 2/2004 | Uemura | B60H 1/00692 454/121 |
| 2003/0145978 A1 | 8/2003 | Tsurushima et al. | |
| 2012/0180393 A1 | 7/2012 | Suzuki | |

FOREIGN PATENT DOCUMENTS

| | | | |
|---|---|---|---|
| JP | 2001158218 A | 6/2001 | |
| JP | 2004114899 A | 4/2004 | |
| JP | 2007210366 A | 8/2007 | |
| JP | 2008100593 A | 5/2008 | |
| JP | 2009184495 A | 8/2009 | |
| JP | 2012144214 A | 8/2012 | |
| JP | 2013133069 A | 7/2013 | |

OTHER PUBLICATIONS

International Search Report and Written Opinion (in Japanese with English Translation) for PCT/JP2013/006303, dated Jan. 28, 2014; ISA/JP.

\* cited by examiner

AIR PASSAGE OPENING AND CLOSING DEVICE

CROSS REFERENCE TO RELATED APPLICATIONS

This application is a U.S. National Phase Application under U.S.C. 371 of International Application No. PCT/JP2013/006303 filed on Oct. 24, 2013 and published in Japanese as WO 2014/073175 A1 on May 15, 2014. This application is based on and claims the benefit of priority from Japanese Patent Application No. 2012-246456 filed on Nov. 8, 2012. The entire disclosures of all of the above applications are incorporated herein by reference.

TECHNICAL FIELD

The present disclosure relates to an air passage opening and closing device opening or closing an air passage by using a slide door.

BACKGROUND OF ART

Conventionally, an air conditioner for a vehicle uses an air passage opening and closing device as described in Patent Document 1. In such a conventional technique, an air passage defined in a case is opened or closed by sliding a slide door that has a door body having a plate shape.

When the slide door is located to close the air passage, a case-side sealing surface provided with the case is in contact with a plate surface of the door body such that a sealing performance is produced.

The slide door is constituted as an air mix door adjusting a temperature of air that is blown into a passenger compartment. Specifically, the slide door is located between an evaporator and a heater core in the case and adjusts a volume ratio between an air volume of warm air after passing through the heater core and an air volume of cool air flowing as bypassing the heater core.

PRIOR ART DOCUMENT

Patent Document

Patent Document 1: JP 2012-144214 A

SUMMARY OF INVENTION

According to studies conducted by inventors of the present disclosure, in a case of using the above conventional technique, the door body of the slide door is contracted un-uniformly when the slide door is heated partially. For example, in the above conventional technique, the slide door is heated partially by heat of the heater core since the slide door is located near the heater core.

When the door body is contracted un-uniformly, the door body is deformed against a case-side sealing surface of the door body. In the result, a clearance is defined between the door body and the case-side sealing surface, and there may be a possibility of causing a self-induced vibration of the slide door since a periodic vortex of air is caused by air flowing into the clearance.

The present disclosure has been made in view of the fore going matters, and it is an objective of the present disclosure to suppress a self-induced vibration of the slide door.

To achieve the above objective, an air passage opening and closing device of the present disclosure has: a case defining an air passage; and a slide door having a door body that has a plate shape, the slide door slidably disposed in the case and opening or closing the air passage.

In the air passage opening and closing device, the case is provided with a case-side sealing surface that is in contact with the door body when the slide door is located to close the air passage.

The door body is provided with a rib that protrudes toward an upstream side in a flow direction of air and extends in a moving direction of the slide door.

Since the door body is provided with the rib, a reaction force of the door body against a converse warpage increases. Therefore, since the converse warpage of the door body can be suppressed, a formation of a clearance between a door body and the case-side sealing surface can be suppressed, and the self-induced vibration of the slide door can be suppressed.

Alternatively, the door body may be molded by resin-molding and annealed at a temperature that is higher than or equal to a temperature under a usage environment.

By annealing the door body at the temperature that is higher than or equal to a temperature under a usage environment, the converse warpage of the door body can be suppressed. Therefore, a formation of clearance between the door body and the case-side sealing surface can be suppressed, and the self-induced vibration of the slide door can be suppressed.

Alternatively, in the air passage opening and closing device in the present disclosure, the air passage opening and closing device may further have a pressing part that presses a portion of the door body being in contact with the case-side sealing surface to the case-side sealing surface.

Since the pressing part presses the door body toward the case-side sealing surface, the clearance can be narrow even if the converse warpage of the door body is caused, and the self-induced vibration of the slide door can be suppressed since the door body is in contact with the case-side sealing surface physically.

Alternatively, the door body may be provided with a disturbing part at an end portion of the door body in a moving direction of the slide door such that a cross-sectional shape of the door body is changed in a door width direction of the door body, and an air flow is disturbed, by the disturbing part.

Since the air flow around the end portion of the door body in the moving direction of the slide door is disturbed by the disturbing part, a cause of a uniform vortex in the air flow around the clearance that is defined between the door body and the case-side sealing surface can be suppressed, and the self-induced vibration of the slide door can be suppressed.

DESCRIPTION OF EMBODIMENTS (First Embodiment)

Figure 1:
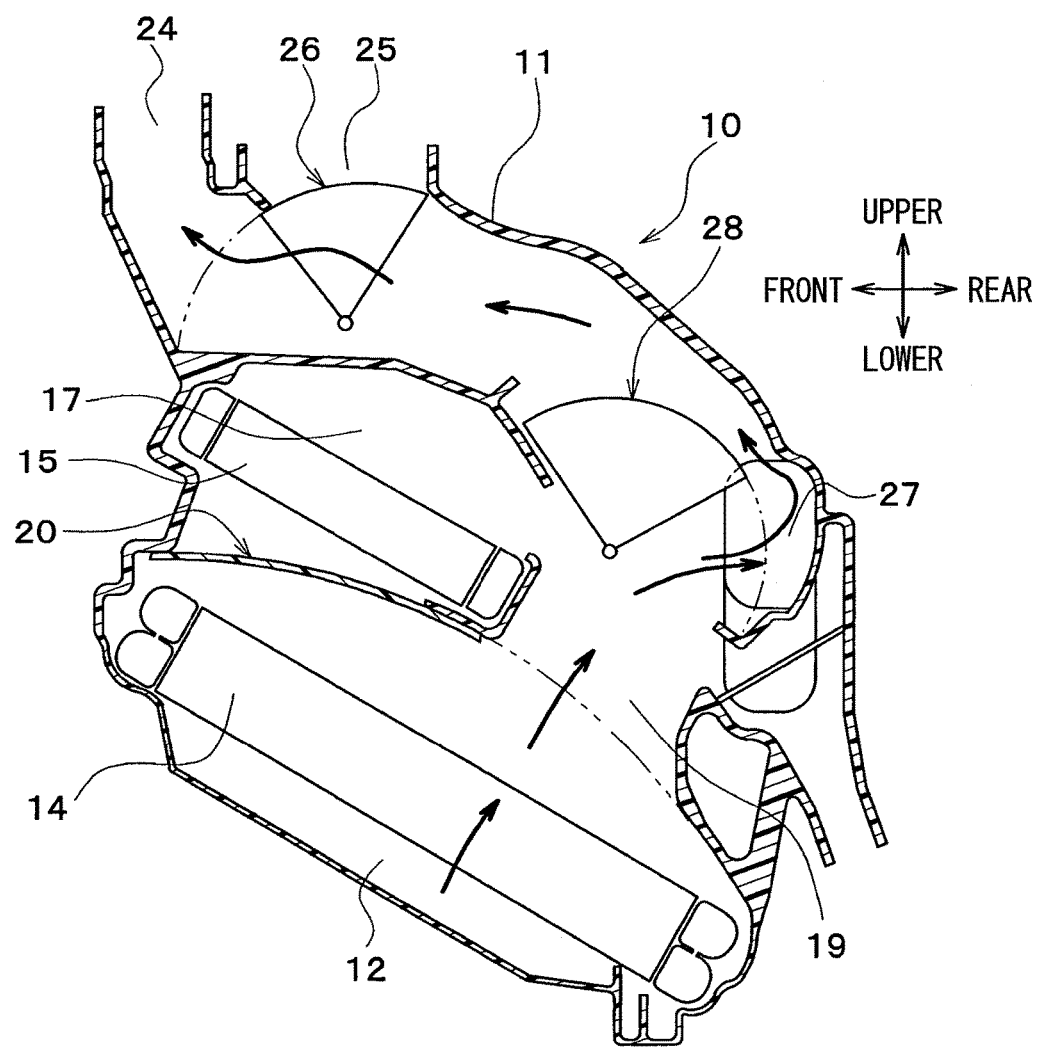
FIG. 1 is a sectional view illustrating an interior air-conditioning unit for an air-conditioner for a vehicle according to a first embodiment.

A first embodiment will be described hereafter referring FIGS. 1 to 6. FIG. 1 is a sectional view illustrating an interior air-conditioning unit 10 in an air-conditioner for a vehicle of the present embodiment. Each arrow pointing front, rear, upper, lower in FIG. 1 shows a direction on a condition that the interior air-conditioning unit 10 is mounted in the vehicle.

The interior air-conditioning unit 10 is located inside an instrument board (i.e., an instrument panel) that is located at a foremost part in a passenger compartment, and located at generally center of the instrument board in a lateral direction (i.e., a left-right direction) of the vehicle. The interior air-conditioning unit 10 has a case 11 providing an outer wall of the interior air-conditioning unit 10 and defining an air passage for air that is blown into the passenger compartment. The case 11 has a certain level of elasticity, and is made of plastic (e.g., polypropylene) having high intensity.

The case 11 defines an air inflow space 12 in a most upstream area in the air passage, and air from a blower unit flows into the air inflow space 12. In the present embodiment, the air inflow space 12 is defined in a lowermost area inside the case 11.

The blower unit is located away from the interior air-conditioning unit 10 in the lateral direction (specifically, to a passenger seat side). The blower unit has an inside-outside air switching case that switches intake air between inside air (i.e., air inside the passenger compartment) and outside air (i.e., air outside the passenger compartment) and a centrifugal blower blowing air that is introduced into the inside-outside air switching case.

In the case 11, an evaporator 14 is located on an upper side of the air inflow space 12. The evaporator 14 is one of components constituting a vapor compression type refrigeration cycle (not shown). The evaporator 14 is a cooling heat exchanger cooling air that is blown into the passenger compartment, and evaporates a low-pressure refrigerant such that the low-pressure refrigerant absorbs heat.

The evaporator 14 is located in a state of extending generally horizontally. That is, the evaporator 14 is located such that a heat exchanging surface (i.e., a core surface) of the evaporator 14 extends generally in a horizontal direction, and that air passes through the evaporator 14 from a lower side to an upper side of the evaporator 14.

A heater core 15 is located above the evaporator 14 on a downstream side of the evaporator 14. The heater core 15 is a heating heat exchanger. An engine coolant having a high temperature and circulating in an engine-coolant circuit flows into the heater core 15, and the engine coolant exchanges heat with a cool air cooled in the evaporator 14. Accordingly, the cool air is heated again in the heater core 15.

The heater core 15 is located in a state of extending generally horizontally. That is, the heater core 15 is located such that a heat exchanging surface (i.e., a core surface) extends generally in the horizontal direction, and that air passes through the heater core 15 from a lower side to an upper side of the heater core 15.

On the upper side of the evaporator 14, a warm air passage 17 and a cool air passage 19 are located in parallel. The warm air passage (i.e., the air passage) 17 is a ventilation passage for the heater core 15. The cool air passage (i.e., the air passage) 19 is a bypass passage in which cool air after passing the evaporator 14 flows as bypassing the heater core 15. The cool air passage 19 is located on a rear side of the heater core 15 and the warm air passage 17.

An air mix door 20 is located directly above the evaporator 14 and between the evaporator 14 and the heater core 15 and adjusts an air volume ratio between an air volume of cool air flowing into the warm air passage 17 and the heater core 15 and an air volume of cool air flowing into the cold air passage 19. The air mix door 20 is equivalent to a slide door of the present disclosure and operated to move generally in a front-rear direction by a servo motor (not shown) or by a manual operation.

More specifically, by moving the air mix door 20 to slide forward in the front-rear direction, an opening degree of the cool air passage 19 increases, and an opening degree of the warm air passage 17 decreases. Conversely, by moving the air mix door 20 to slide backward in the front-rear direction, the opening degree of the cool air passage 19 decreases, and the opening degree of the warm air passage 17 increases.

By a control of the opening degrees using the air mix door 20, the air volume ratio between the air volume of the warm air after passing through the heater core 15 and the air volume of the cool air flowing as bypassing the heater core 15 is adjusted, and a temperature of air that is blown into the passenger compartment is adjusted. That is, the air mix door 20 constitutes a temperature adjusting part for air that is flown into the passenger compartment.

A defroster opening 24 is defined on an upper surface of a foremost part in the case 11, and air of which temperature is adjusted in the case 11 flows toward a windshield of the vehicle through the defroster opening 24. The air after passing the defroster opening 24 is blown toward an inner surface of the windshield through a defroster duct (not shown) and a defroster outlet defined on an upper surface of the instrument panel or the like in the vehicle.

A face opening 25 is defined on the upper surface of the case 11 and on a rear side in the case 11, and the air of which temperature is adjusted in the case 11 flows toward a face of a passenger through the face opening 25. Specifically, air after passing the face opening 25 is blown toward the face of the passenger through a face duct (not shown) and a face outlet formed on a front surface of instrument panel or the like in the vehicle.

A defroster-face door (i.e., a blowing mode switching door) 26 is located directly below the defroster opening 24 and the face opening 25 and adjusts an air volume of conditioned air to be passed through the defroster opening 24 and an air volume of conditioned air to be passed through the face opening 25.

The defroster-face door 26 is constituted by a rotary door. The rotary door is a door having a shaft and a door body. The door body has an outer surface that is located on a radial-outer side of the shaft and having an arc shape and right and left plates having a sector shape. Both end sides of the arc-shaped outer surface in an axial direction of the shaft are connected to the shaft through the right and left plates. The defroster-face door 26 is operated to rotate by a manual operation or by a servo motor (not shown).

A foot opening 27 is defined in a side portion of the case 11 on a rear side in the case 11, and the air of which temperature is adjusted in the case 11 flows toward foot of the passenger through the foot opening 27. Specifically, air after passing the foot opening 27 is blown toward the foot of the passenger through a foot duct (not shown) and a foot outlet located around the foot of the passenger in the passenger compartment.

A foot door (i.e., a blowing mode switching door) is located at the foot opening 27 to open or close the foot opening 27. The foot door 28 is constituted by a rotary door and operated to rotate by a manual operation or by a servo motor (not shown).

Figure 2:
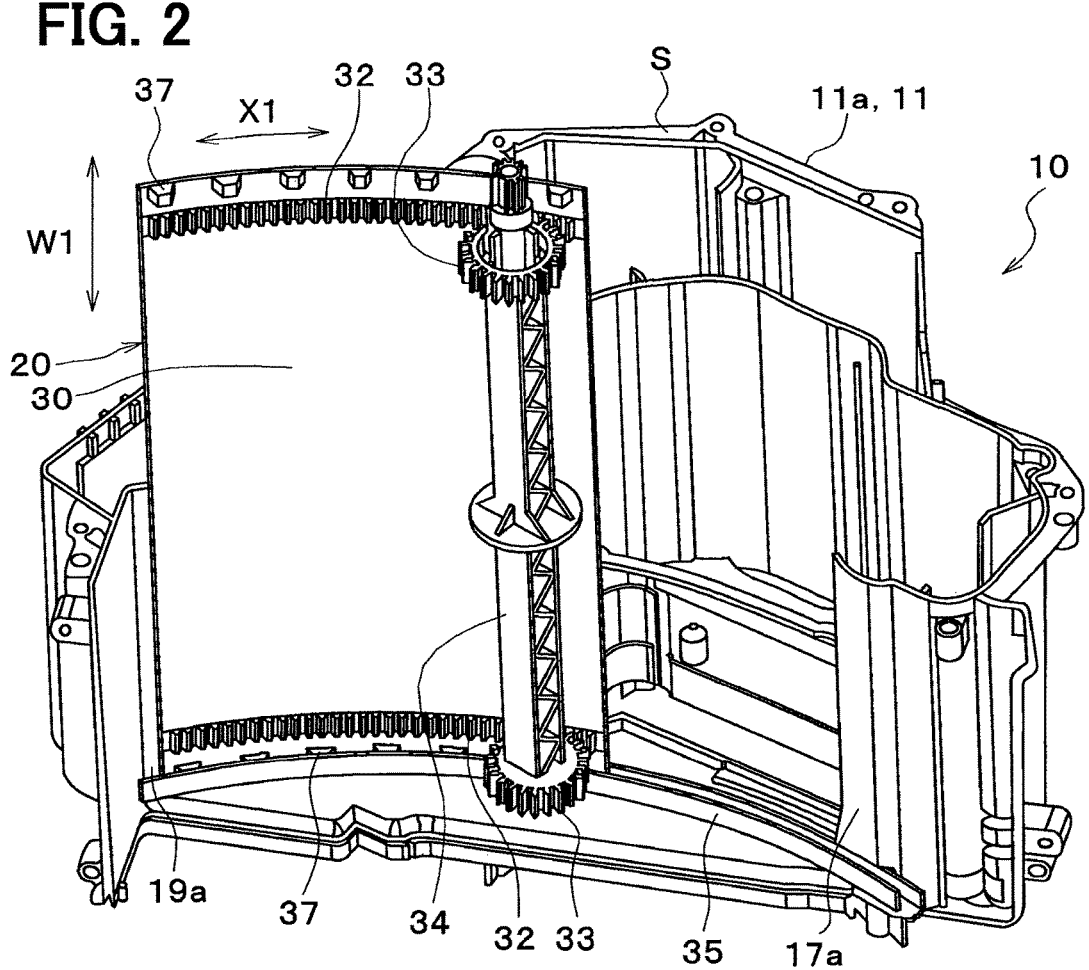
FIG. 2 is an exploded perspective view illustrating a main section of the interior air-conditioning according to the first embodiment.

FIG. 2 is an exploded perspective view illustrating peripheral parts of the air mix door 20 in the interior air-conditioning unit 10. A width direction of a door body 30 of the air mix door 20 is defined to as a door width direction W1, and a moving direction of the air mix door 20 is defined to as a moving direction X1. In FIG. 2, the door width direction W1 and the moving direction X1 are shown by arrows.

The case 11 has a division surface S extending in an upper-lower direction of the vehicle generally at a center in the lateral direction of the vehicle, and the division surface S can divide the case 11 into two case portions in the left-right direction. The two case portions are coupled with each other by a fastening part such as a metal spring, a clip, or a screw in a state of housing various components such as the evaporator 14 and the heater core 15. In FIG. 2, one of the two case portions is shown as a case portion 11*a*.

The air mix door 20 has the door body 30 that is made of resin and has a plate shape. The air mix door 20 is located in the case 11 such that the door width direction W1 of the door body 30 coincides the lateral direction of the vehicle, and the moving direction X1 of the air mix door 20 is generally parallel with the upper-lower direction of the vehicle. FIG. 2 shows a state that the door body 30 is located to fully close the cool air passage 19 (i.e., fully open the warm air passage 17).

A case-side sealing surface 19*a* is provided with a peripheral portion of the cool air passage 19. The door body 30 of the air mix door 20 is located on an upstream side (i.e., a lower side in FIG. 1) of the case-side sealing surface 19*a* in a flow direction of air. When the air mix door 20 closes the cool air passage 19, and the door body 30 receives a wind pressure, a sealing effect is produced since a plate surface of the door member 30 is in contact with the case-side sealing surface 19*a*.

A case-side sealing surface 17*a* is provided with a peripheral portion of the warm air passage 17, and the door body 30 of the air mix door 20 is located on an upstream side of the case-side sealing surface 17*a* in the flow direction of air. When the air mix door 20 closes the warm air passage 17, and the door body 30 receives a wind pressure, a sealing effect is produced since a plate surface of the door member 30 is in contact with the case-side sealing surface 17*a*.

The case 11 has a side wall that provides a guide wall surface 35 extending in the moving direction X1 and facing the case-side sealing surfaces 17*a*, 19*a*. The guide wall surface 35 is located on the upstream side of the case-side sealing surfaces 17*a*, 19*a* in the flow direction of air.

The case-side sealing surfaces 17*a*, 19*a* and the guide wall surface 35 have a curved shape curving like an arc in cross-section that is taken along a line perpendicular to the door width direction W1. In other words, the case-side sealing surfaces 17*a*, 19*a* and guide wall surface 35 curve to swell toward the downstream side in the flow direction of air (i.e., the upper side in FIG. 1). A distance between the case-side sealing surfaces 17*a*, 19*a* and the guide wall surface 35 is fixed.

Both end portions of the door body 30 in the door width direction W1 are inserted between the case-side sealing surfaces 17*a*, 19*a* and the guide wall surface 35. The door body 30 has a flat plate shape before being attached. The door body 30 is curved (i.e., elastically deformed) along the case-side sealing surfaces 17*a*, 19*a* and the guide wall surface 35 that have the curved shape, on a condition that the both ends of the door body 30 is inserted between the case-side sealing surfaces 17*a*, 19*a* and the guide wall surface 35. The case-side sealing surfaces 17*a*, 19*a* and the guide wall surface 35 define a guide groove guiding the door body 30 to move slidably.

The door body 30 is integrally provided with a driven gear 32. The driven gear 32 is a rack extending parallel with the moving direction X1 and protrudes from the plate surface of the door body 30 toward the upstream side in the flow direction of air.

The driven gear 32 is located on an inner side of both edges of the door body 30 in the door width direction W1. The driven gear 32 is located on an inner side of the guide wall surface 35 in the door width direction W1 in a state that the door body 30 is inserted into the guide groove (i.e., the case-side sealing surface 17*a*, the case-side sealing surface 19*a*, and the guide wall surface 35).

A driving gear (e.g., a pinion) 33 that has a circular shape and engages with the driven gear 32 is connected to a driving shaft 34 extending in the door width direction W1. Both ends of the driving shaft 34 are rotatably supported by a bearing holes (not shown) defined on side walls of the case 11. One end of the driving shaft 34 is connected to a driving device (e.g., a servo motor) (not shown). In the present embodiment, the driving gear 33 and the driving shaft 34 are made of resin and integrally formed with each other.

Figure 3:
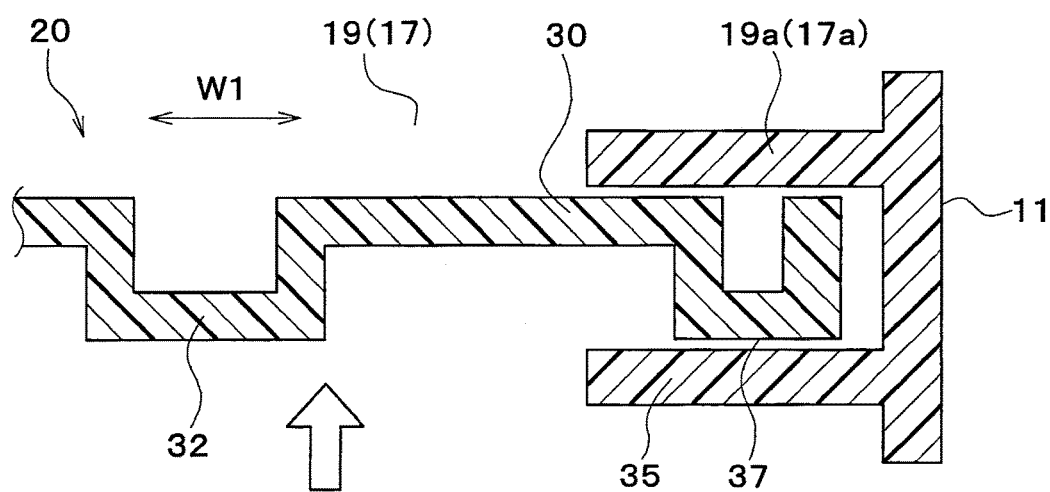
FIG. 3 is a sectional view illustrating a main section of the interior air-conditioning unit according to the first embodiment.
Figure 4:
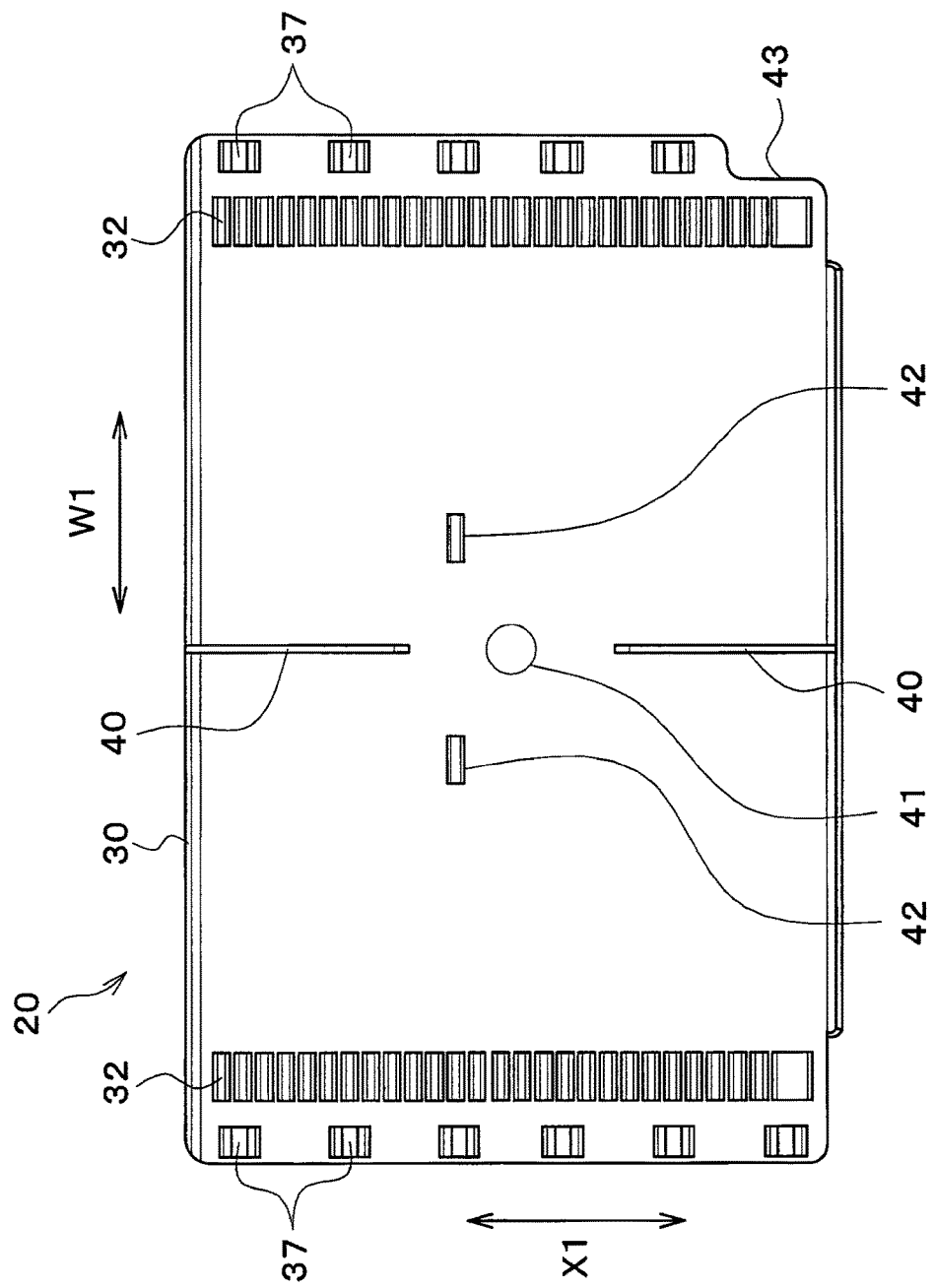
FIG. 4 is a plan view illustrating a slide door of the first embodiment.
Figure 5:
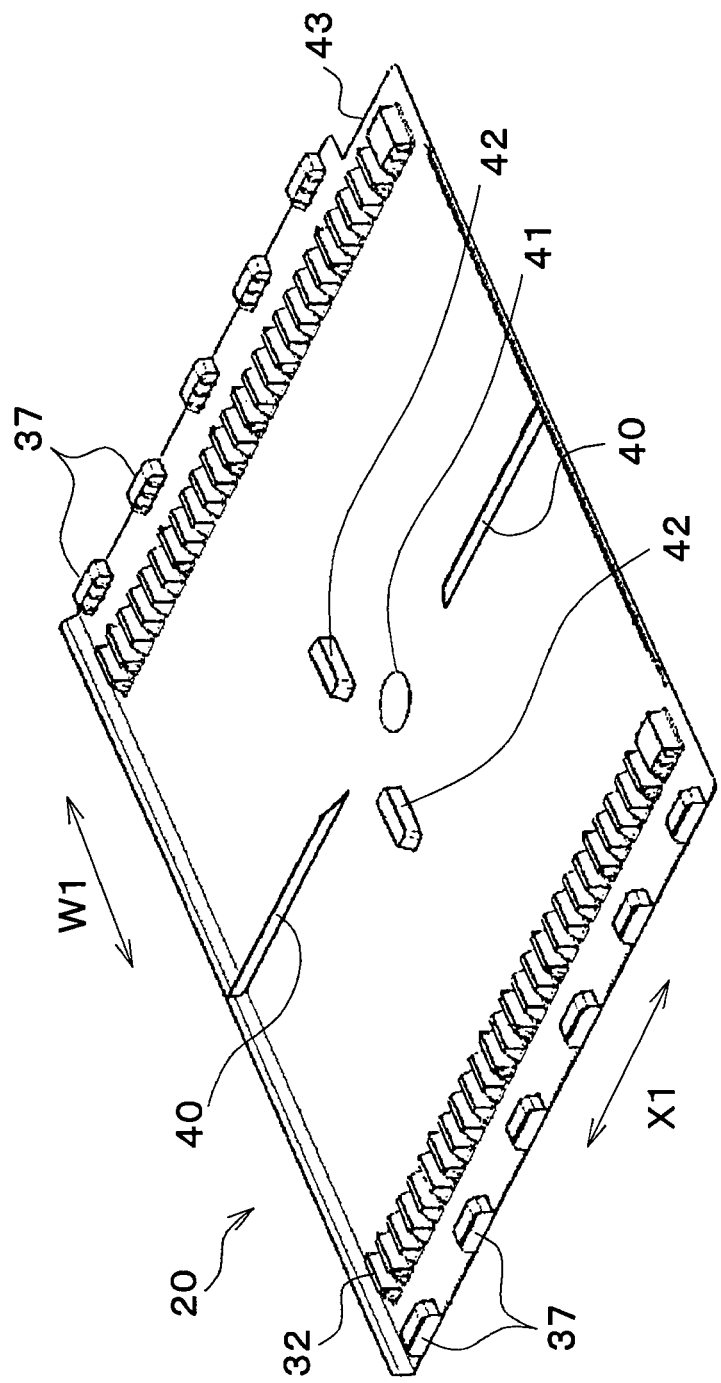
FIG. 5 is a perspective view illustrating the slide door of the first embodiment.

FIG. 3 is a sectional view illustrating the air mix door 20, the case-side sealing surface 19*a*, and the guide wall surface 35, FIG. 4 is a plan view illustrating the air mix door 20, and FIG. 5 is a perspective view illustrating the air mix door 20.

Although FIG. 3 shows a section of the cool air passage 19, a section of the warm air passage 17 is the same as that of the cool air passage 19 shown in FIG. 3. Therefore, reference numbers corresponding to the section of the warm air passage 17 are assigned in the parenthesis in FIG. 3, and an illustration of the section of the warm air passage 17 is omitted.

The both end portions of the door body 30 in the door width direction W1 have protruding portions 37 protruding toward the guide wall surface 35 (i.e., downward in FIG. 3). The protruding portions 37 are arranged one after another in a direction parallel with the moving direction X1.

In a state that the door body 30 is inserted to the guide groove, the protruding portions 37 are located inside the guide groove. Accordingly, the clearance between the case-side sealing surfaces 17*a*, 19*a* and the door body 30 decreases, and the sealing effect can be produced.

The protruding portions 37 are arranged to be distanced from each other. Accordingly, a curvature deformation of the door body 30 is not restricted by the protruding portions 37.

Figure 6:
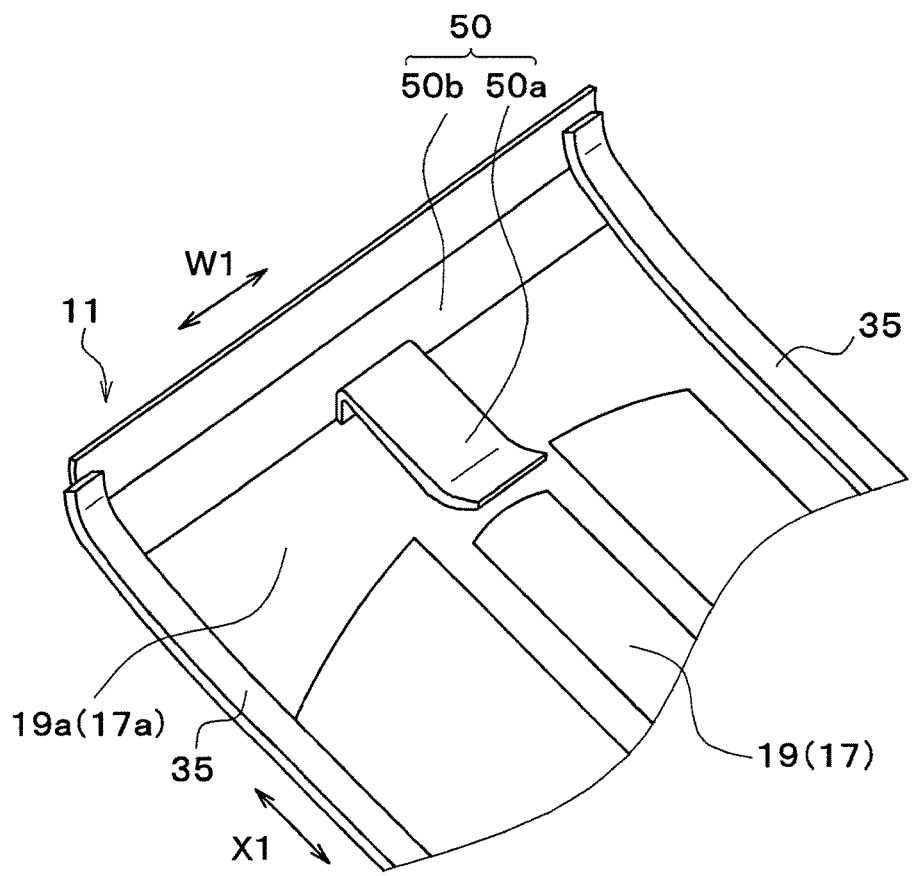
FIG. 6 is a perspective view illustrating a case-side sealing surface of a second embodiment.

As shown in FIGS. 5 and 6, both end portions of the door body 30 in the moving direction X1 have a curved shape curving away from the case-side sealing surfaces 17*a*, 19*a*.

Therefore, when the air mix door 20 slides in the moving direction X1, a tip portion of the door body 30 in the moving direction X1 can be prevented from being stuck with the case-side sealing surfaces 17a, 19a.

The door body 30 is provided with a rib 40 protruding away from the case-side sealing surfaces 17a, 19a (i.e., upward in FIG. 5) and extending in the moving direction X1. In FIG. 2, an illustration of the rib 40 is omitted for illustrational reasons.

The rib 40 is located at a center of the door body 30 in the door width direction W1 and extends straight in the moving direction X1 from both ends (i.e., portions having the curved shape) of the door body 30 in the moving direction X1. That is, the rib 40 is connected to the portions having the curved shape in the door body 30.

For reasons of resin-molding, the rib 40 is divided into a one-end side portion and the other-end side portion in the moving direction X1 to avoid a gate trace 41 that is located at a center portion of the door body 30. Since the rib 40 is divided into the one-end side portion and the other-end side portion in the moving direction X1, the rib 40 is prevented from being interfered by an ejector pin located in a mold for resin-molding.

The rib 40 divided in the moving direction X1 has an end portion that is adjacent to the gate trace 41 (i.e., the center portion of the door body 30), and the end portion has a tapered shape in which a height of the rib 40 decreases toward the gate trace 41. Accordingly, melted resin injected from a gate to the mold in the resin-molding easily flows into a portion for the rib 40 in the mold, and the rib 40 can be formed easily and certainly.

The height of the rib 40 is higher than or equal to a specified height. Specifically, the height of the rib 40 is set to a height at which a reaction force that is produced when the both end portions of the door body 30 in the moving direction X1 and the center portion of the door body 30 in the door width direction W1 are deformed away from the case-side sealing surfaces 17a, 19a is higher than or equal to a specified reaction force.

The rib 40 has a plate thickness (i.e., a thickness in the door width direction W1) that is smaller than or equal to a plate thickness of the door body 30. Accordingly, a plate surface of the door body 30 that is on a side of the door body 30 facing a side having the rib 40 can be prevented from having a shrinkage (i.e., a recess formed when a resin material is shrank in the resin-molding). Therefore, the door body 30 and the case-side sealing surfaces 17a, 19a can be prevented from having a clearance formed by the shrinkage therebetween, and the sealing effect can be prevented from deteriorating by the clearance.

In an example shown in FIGS. 4 and 5, the door body 30 has the protruding portion 42 and a notch 43. The protruding portion 42 is provided for an assembly process of the interior air-conditioning unit 10, and an industrial robot can grasp the air mixing door 20 by the protruding portion 42 in the assembly process. The notch 43 is provided for avoiding an interference with a refrigerant pipe in the case 11.

An electric controller of the present embodiment will be described hereafter. An output side of an air-conditioning controller (not shown) connects various actuators such as servo motors for the air mix door 20, the defroster-face door 26, and the foot door 28, and an electric motor 23 for the blower 21. The various actuators are controlled by control signals output from the air-conditioning controller.

The air-conditioning controller includes a well-known microcomputer having CPU, ROM, RAM and a peripheral circuit. The air-conditioning controller stores an air-conditioning control program in the ROM and operates various calculations and arithmetic processes based on the air-conditioning control program to control performances of air conditioning devices connected to the output side.

An input side of the air-conditioning controller connects various sensors and a control panel. The various sensors detect a vehicle environment such as an outside temperature Tam, an inside temperature Tr, and a solar radiation amount Ts insolating an inside of the passenger compartment. The control panel has an operation switch outputting operation signals for the air conditioner for the vehicle, a temperature setting switch setting a target temperature Tset for the inside of the passenger compartment, and the like.

An operation of the present embodiment using the above constitution will be described hereafter. In a vehicle operation state, the air-conditioning control program stored in the ROM of the air-conditioning controller is performed when the operation switch is turned on. When the air-conditioning control program is performed, detection signals detected by the various sensors and control signals from the control panel are read. Subsequently, a target blowing temperature TAO for air that is blown into the passenger compartment is calculated based on the signals.

The air-conditioning controller determines a rotation speed of the blower 21 (i.e., a volume of air blown by the blower 21), an opening-closing state of the defroster-face door and the foot door, a target opening degree of the air mix door 20, or the like and outputs control signals to the various actuator such that a determined control state is performed.

Then, a routine of reading control signals and detection signals, calculating the target blowing temperature TAO, determining a control state, and outputting control signals is repeated.

When the air-conditioning controller operates the driving shaft 34 to rotate by outputting the control signals to a door driving device (not shown), the door body 30 slides by an engagement between the driven gear 32 and the driving gear 33. At this time, the door body 30 is guided to slide by the guide groove.

When the door body 30 closes the cool air passage 19, and the door body 30 receives a wind pressure, a sealing effect is produced since the plate surface of the door member 30 is in contact with the case-side sealing surface 19a. When the door body 30 closes the warm air passage 17, and the door body 30 receives a wind pressure, a sealing effect is produced since the plate surface of the door member 30 is in contact with the case-side sealing surface 17a.

Since the door body 30 is located adjacent to the heater core 15 in the case 11, heat of the heater core 15 is transferred to a part of the door body 30. Accordingly, an un-uniform temperature distribution causes in the door body 30, and the door body 30 may be contracted un-uniformly. In the result, the both end portions of the door body 30 in the moving direction X1 may be deformed away from the case-side sealing surfaces 17a, 19a at the center portion of the both end portions in the door width direction W1. Such deformation of the door body 30 will be hereafter referred to as a converse warpage.

According to the present embodiment, since the door body 30 is provided with the rib 40, the reaction force of the door body 30 against the converse warpage increases. Therefore, since the converse warpage of the door body 30 can be suppressed, a formation of the clearance between the door body 30 and the case-side sealing surfaces 17a, 19a can be suppressed, and the self-induced vibration of the slide door 20 can be suppressed.

(Second Embodiment)

In the first embodiment, the self-induced vibration of the slide door 20 is suppressed by suppressing the converse warpage of the door body 30. In a second embodiment, the self-induced vibration of the slide door 20 is suppressed by pressing the door body 30 against the case-side sealing surfaces 17a, 19a.

FIG. 6 is a perspective view illustrating an inside of the cool air passage 19, and a perspective view illustrating an inside of the warm air passage 17 is similar to the perspective view of the cool air passage 19 shown in FIG. 6. Therefore, reference numbers corresponding to the perspective view illustrating the inside of the warm air passage 17 are assigned in the parenthesis in FIG. 6, and an illustration of the perspective view illustrating the inside of the warm air passage 17 is omitted.

As shown in FIG. 6, the case-side sealing surface 19a (17a) has a pressing part 50. The pressing part 50 has a pressing portion 50a that presses the door body 30 against the case-side sealing surface 19a (17a) and a supporting portion 50b that supports the pressing portion 50a. The pressing portion 50a and the supporting portion 50b are made of resin or metal and integrally formed with each other.

The supporting portion 50b extends in the door width direction W1 and is fixed such that both lateral end portions of the supporting portions 50b are inserted to the guide groove (i.e., the case-side sealing surface 19a (17a) and the guide wall surface 35). The pressing portion 50a has a lingulate shape and protrudes from the supporting portion 50b in the moving direction X1 toward the air passage 19 (17).

When the door body 30 slides and positioned at a location where the door body 30 is in contact with the case-side sealing surface 19a (17a), the door body 30 is inserted between the pressing portion 50a and the case-side sealing surface 19a (17a), and the pressing portion 50a is elastically deformed to be pushed away from the case-side sealing surface 19a (17a).

Since the pressing part 50a presses the door body 30 against the case-side sealing surface 19a (17a) by elastic reaction, the self-induced vibration of the slide door 20 can be suppressed even when the converse warpage of the door body 30 is caused.

(Third Embodiment)

In the first embodiment, the self-induced vibration of the slide door 20 is suppressed by restricting a cause of the clearance between the door body 30 and the case-side sealing surfaces 17a, 19a. According to a third embodiment, the self-induced vibration of the slide door 20 is suppressed by restricting a cause of a uniform vortex in an air flow around the clearance that is defined between the door body 30 and the case-side sealing surfaces 17a, 19a.

Specifically, as shown in FIGS. 7 to 12, the both end portions of the door body 30 in the moving direction X1 has a disturbing part 55, 56, or 57 such that a cross-sectional shape of the door body 30 in the door width direction W1 is changed and disturbs an air flow.

Figure 7:
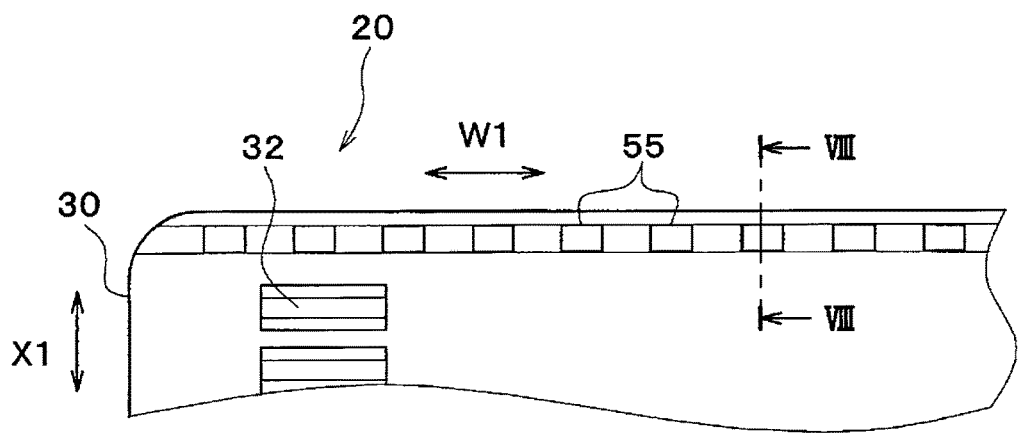
FIG. 7 is a plan view illustrating a slide door of a first example regarding a third embodiment.
Figure 8:
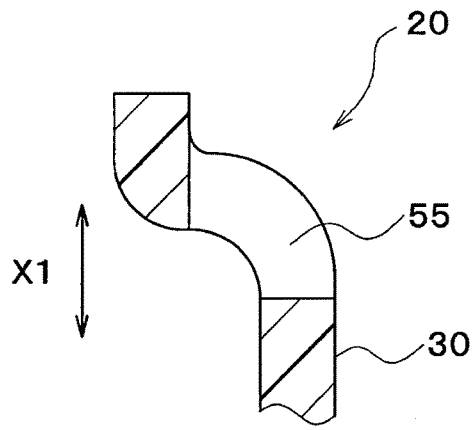
FIG. 8 is a sectional view taken along a line VIII-VIII shown in FIG. 7.

FIGS. 7 and 8 show a first example in which through holes 55 are defined in the both end portions of the door body 30 in the moving direction X1 having the curved shape. The through holes 55 passes through the door body 30 and are arranged one after another as being distanced from each other in the door width direction W1.

When air passes the through holes 55, an air flow is disturbed, and a cause of a uniform vortex is suppressed. Accordingly, the self-induced vibration of the slide door 20 can be suppressed.

Figure 9:
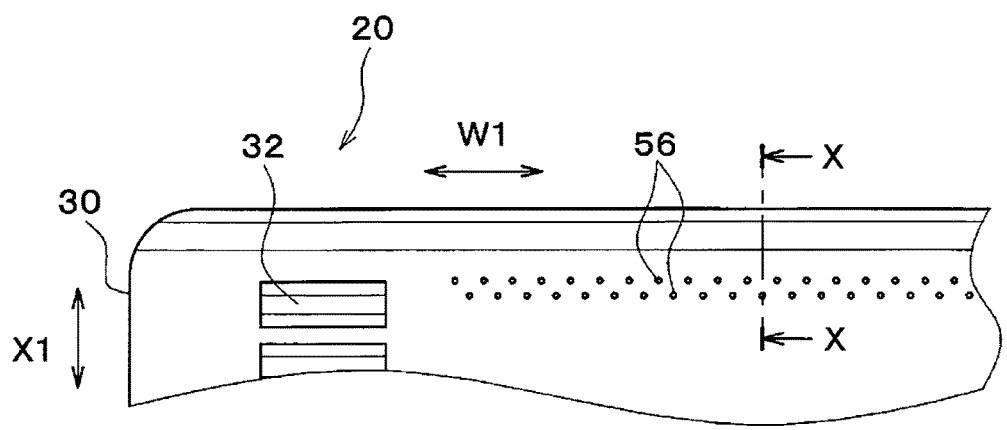
FIG. 9 is a plan view illustrating a slide door of a second example regarding the third embodiment.
Figure 10:
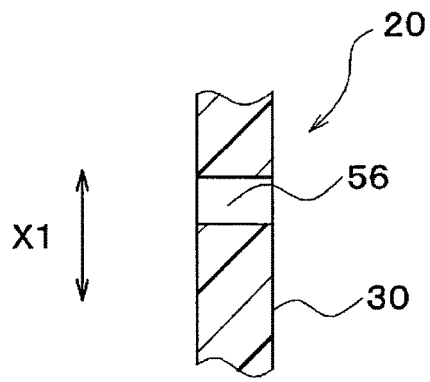
FIG. 10 is a sectional view taken along a line X-X shown in FIG. 9.

FIGS. 9 and 10 show a second example in which pinholes 56 are defined in the both end portions of the door body 30 in the moving direction X1 that are in contact with the case-side sealing surfaces 17a, 19a. The pinholes 56 pass through the door body 30. In the second example, a diameter of each of the pinholes 56 is 0.5 mm.

When air passes a part of the door body 30 having the pinholes 56, an air flow is disturbed, and a cause of an uniform vortex is suppressed. Accordingly, the self-induced vibration of the slide door 20 can be suppressed. Furthermore, since the pinholes 56 pass through the door body 30, a negative pressure caused when air flows in the clearance that is defined between the door body 30 and the case-side sealing surfaces 17a, 19a can be decreased. In other words, a pressure difference between a pressure on one side and a pressure on the other side of the door body 30 in the moving direction X1 can be decreased. Therefore, the self-induced vibration of the slide door 20 can be suppressed.

Figure 11:
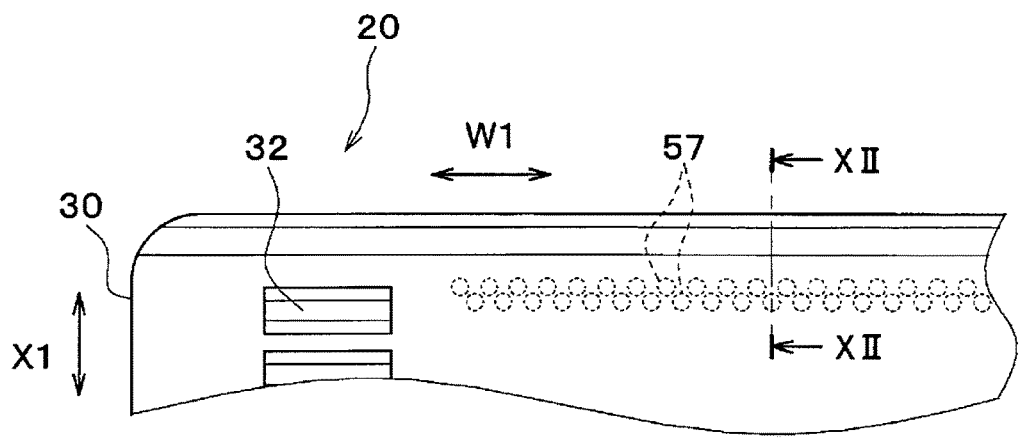
FIG. 11 is a plan view illustrating a slide door of a third example regarding the third embodiment.
Figure 12:
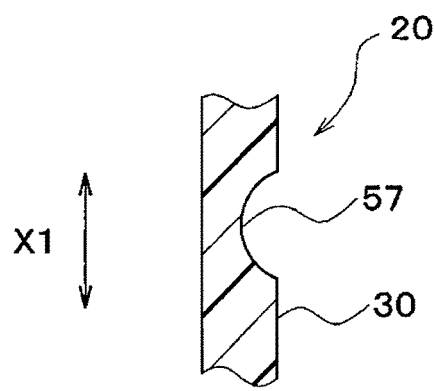
FIG. 12 is a sectional view taken along a line XII-XII shown in FIG. 11.

FIGS. 11 and 12 show a third example in which dimples 57 are defined in the both end portions of the door body 30 in the moving direction X1 that are in contact with the case-side sealing surfaces 17a, 19a. The dimples 57 are recessed away from the case-side sealing surfaces 17a, 19a. The dimples 57 has a circular shape in plane and has an arc shape in cross-section.

When air flows around the dimples 57, an air flow is disturbed, and a cause of a uniform vortex is suppressed. Accordingly, the self-induced vibration of the slide door 20 can be suppressed.

(Other Modifications)

It should be understood that the present disclosure is not limited to the above embodiments. The present disclosure is intended to cover various modifications as described hereafter.

(1) In the first embodiment, plural ribs 40 may be arranged one after another in the door width direction W1. Accordingly, the reaction force of the door body 30 against the converse warpage increases, and the converse warpage can be suppressed more certainly.

(2) In the first embodiment, a stiffness of the rib 40 may be improved by connecting a portion of the door body 30 having the curved shape with the rib 40 in a fillet shape.

(3) In the first embodiment, the converse warpage of the door body 30 is suppressed by providing the door body 30 with the rib 40. However, the converse warpage of the door body 30 may be suppressed without the rib 40 by using the slide door 20 that is annealed at a temperature (e.g., 100° C.) that is higher than or equal to a temperature under a usage environment after molded by resin-molding.

Although the door body 30 is made of resin in the above embodiment, it is just an example. The door body 30 may be made of a thin metal plate or the like.

Although an example in which the present disclosure is used for an air mix door in the air conditioner for a vehicle is described in the above embodiments, the present disclosure is not limited to the example. The present disclosure may be used for a blowing-mode switching door or an inside-outside air switching door used in an air conditioner for a vehicle.

Alternatively, the present disclosure may be used for various air passage opening and closing devices such as an air passage opening and closing device in an air conditioner for a house, a building, or the like.

What is claimed is:

1. An air passage opening and closing device comprising:
a case defining an air passage; and
a slide door provided with a door body that has a plate shape, the slide door slidably disposed in the case and opening or closing the air passage, wherein
the case is provided with a case-side sealing surface that is in contact with the door body when the slide door is located to close the air passage,
the door body is provided with a rib that protrudes toward an upstream side in a flow direction of air and extends in a moving direction of the slide door,
the rib is located at a center portion of the door body in a door width direction perpendicular to the moving direction,
the rib is divided into a one-end side portion and an other-end side portion in the moving direction, the one-end side portion and the other-end side portion face each other in the moving direction interposing a void between the one-end side portion and the other-end side portion in the moving direction, and
the one-end side portion and the other-end side portion extend from opposing outer peripheries of the door body in the moving direction.

2. The air passage opening and closing device according to claim 1, wherein
the rib is integrally formed with the door body.

3. The air passage opening and closing device according to claim 1, wherein
the rib has a thickness in the door width direction that is smaller than or equal to a thickness of the door body in the door width direction.

4. The air passage opening and closing device according to claim 1, wherein
the door body has
one edge that extends in the door width direction of the door body and
an other edge that faces the one edge in the moving direction and extends in the door width direction,
the one edge has a center portion in the door width direction, and the one-end side portion of the rib extends from the center portion of the one edge, and
the other edge has a center portion in the door width direction, and the other-end side portion of the rib extends from the center portion of the other edge.

5. The air passage opening and closing device according to claim 4, wherein
the one-end side portion of the rib directly connects to the center portion of the one edge of the door body, and
the other-end side portion of the rib directly connects to the center portion of the other edge of the door body.

6. The air passage opening and closing device according to claim 1, wherein
the door body has a center in the door width direction and in the moving direction, and
each of the one-end side portion and the other-end side portion has an end that is located adjacent to the center of the door body and has a tapered shape.

7. The air passage opening and closing device according to claim 6, wherein
a height of the end decreases toward the center of the door body.

8. An air passage opening and closing device comprising:
a case defining an air passage; and
a slide door provided with a door body that has a plate shape, the slide door slidably disposed in the case and opening or closing the air passage, wherein
the case is provided with a case-side sealing surface that is in contact with the door body when the slide door is located to close the air passage,
the door body is provided with a rib that protrudes toward an upstream side in a flow direction of air and extends in a moving direction of the slide door,
the rib is located at a center portion of the door body in a door width direction perpendicular to the moving direction,
the rib is divided into a one-end side portion and an other-end side portion in the moving direction,
the one-end side portion and the other-end side portion extend from opposing outer peripheries of the door body in the moving direction,
the door body has
one end portion extending in the moving direction and
an other end portion extending in the moving direction and facing the one end portion in the door width direction,
each of the one end portion and the other end portion of the door body has a plurality of protrusions that are arranged in the moving direction to be distanced from each other and protrude toward the upstream side in the flow direction of the air, and
the one-end side portion and the other-end side portion of the rib face each other in the moving direction interposing a void between the one-end side portion and the other-end side portion in the moving direction.

9. The air passage opening and closing device according to claim 8, wherein
the door body has a rack that extends in the moving direction and protrudes toward the upstream side in the flow direction of the air, and
the plurality of protrusions are located between the rack and the case in the door width direction.

10. The air passage opening and closing device according to claim 9, wherein
a width of the rack in the door width direction is greater than a width of each of the plurality of protrusions in the door width direction.

11. The air passage opening and closing device according to claim 9, wherein
the plurality of protrusions, the rack and the rib are parallel to each other.

12. The air passage opening and closing device according to claim 8, wherein
the case further includes a guide groove and the plurality of protrusions are located within the guide groove.

13. The air passage opening and closing device according to claim 8, wherein
the plurality of protrusions are equidistantly spaced apart from each other.

* * * * *